MATHENY & BARNES.
Cultivator.
No 30,741
Patented Nov. 27, 1860.
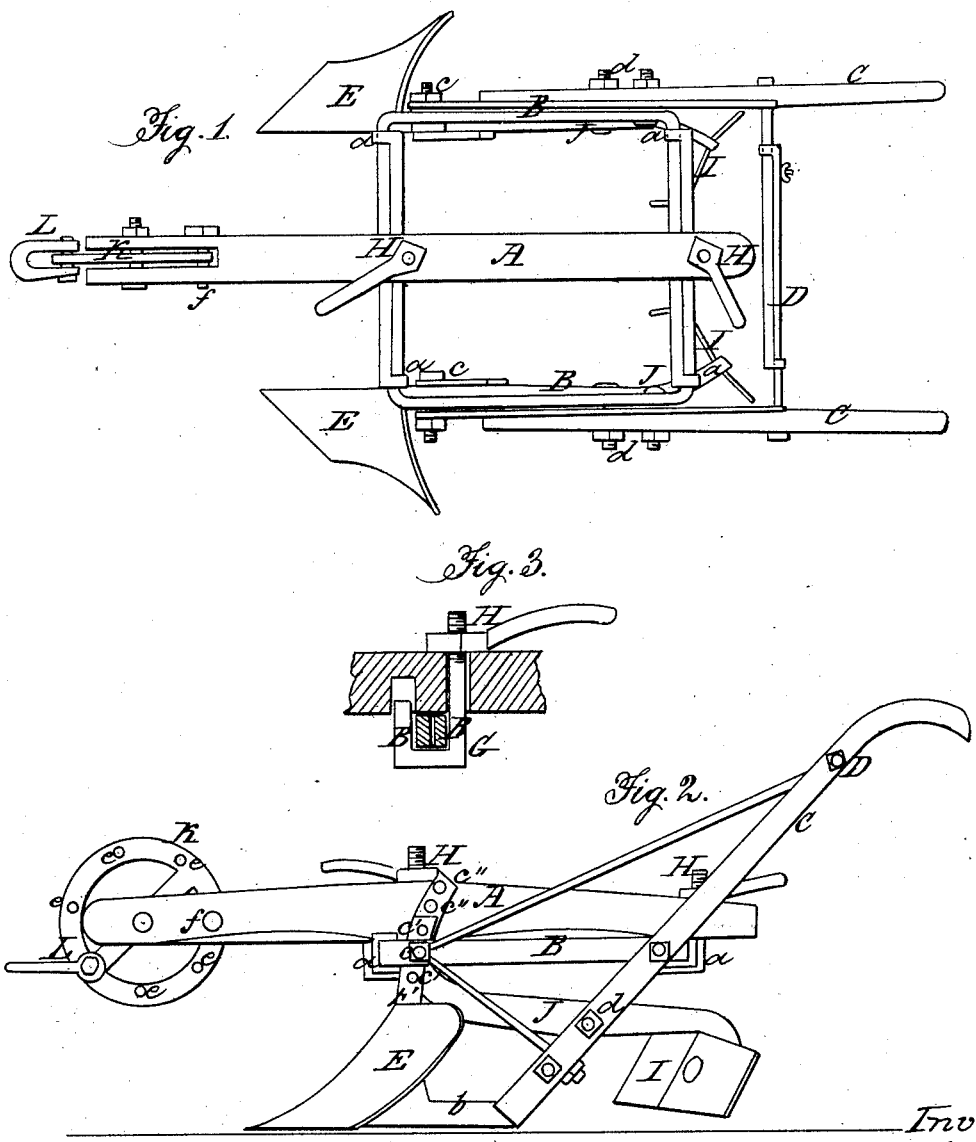

UNITED STATES PATENT OFFICE.

R. G. MATHENY AND L. R. BARNES, OF DE KALB, MISSISSIPPI.

IMPROVEMENT IN PLOWS.

Specification forming part of Letters Patent No. 30,741, dated November 27, 1860.

*To all whom it may concern:*

Be it known that we, R. G. MATHENY and L. R. BARNES, of De Kalb, in the county of Kemper and State of Mississippi, have invented a new and Improved Plow; and we do hereby declare that the following is a full, clear, and exact description of the same, reference being had to the annexed drawings, making a part of this specification, in which—

Figure 1 is a plan or top view of our invention. Fig. 2 is a side view of the same; Fig. 3, a section of the same, showing one of the clamping devices.

Similar letters of reference indicate corresponding parts in the several figures.

This invention relates to an improvement in that class of plows which are designed for cultivating crops, more especially that of cotton; and it consists in a peculiar arrangement of turning-plows and scrapers, as hereinafter described, whereby the labor of cultivating crops which are grown in drills is much reduced and the work performed in a perfect manner.

To enable those skilled in the art to fully understand and construct our invention, we will proceed to describe it.

A represents a plow-beam, and B B are two bars, which are each bent so as to form three sides of a square, the front and back sides being overlapped and connected by loops or eyes $a$, which are formed at the end of each bar. The bars B B form a square metal frame, to which the handles C C are attached, one to each bar. The upper parts of the handles C C are connected by an adjustable or extension rod, D, as shown clearly in Fig. 1. The lower end of each handle C is attached to the landside $b$ of a turn-plow, E, and the foot or standard F of each plow E is of curved form, and the standards are attached to the bars B B by bolts $c$, which pass through either of a series of holes, $c'$, in the bars. The bars B B are secured to the beam A by clamps G, which are of hook form, and have screw-tangs which pass up through the beam, and are provided at their upper ends with hand-nuts H. (See Fig. 3.)

I I are scrapers, which are attached to the back ends of bars J J. The bars J J are attached each by a bolt, $d$, to the lower parts of the handles C C, and these bars extend forward, are curved upward, and secured to the bars B B by the same bolts, $c$, which secure the plow-standards F to the bars B, the front ends of the bars J being provided with holes $c$.

In the front end of the beam A there is placed a wheel, K, which is perforated with holes $e$, into one of which a clevis, L, is attached. This clevis, it will be seen, may be raised or lowered as occasion may require by adjusting a bolt, $f$, which passes through the end of the beam A and through either of the holes $e$ in the wheel K.

The turn-plows E E may be raised or lowered by adjusting the bolts $c$ in the proper holes, $c'$, and the scrapers I may be similarly adjusted by inserting the same bolts, $c$, in the proper holes, $c''$, in the front ends of the bars J.

In order to adjust the plows and scrapers laterally, the hand-nuts H are unscrewed to release the hold of the clamps G, and the bars B B may be moved laterally from or toward each other to suit the width of the space between the rows.

The turn-plows may be used for barring off the sides of the rows and the scrapers for scraping the same, the whole work being done simultaneously. By taking off the scrapers it can be used for bedding land for planting cotton-seed or corn. Two sweeps, scooters, or shovel-plows may also be used when required.

Having thus described our invention, what we claim as new, and desire to secure by Letters Patent, is—

The arrangement of the bars B B, connected with the beam A by the clamps G, in connection with the adjustable feet or standards F F and bars J J, attached to the bars B B, and having the plows and scrapers respectively secured to them, the handles C C being attached to the bars B and landside $b\ b$, and all arranged as and for the purpose set forth.

R. G. MATHENY.
L. R. BARNES.

Witnesses:
WM. H. STEVENSON,
ELIAB FOX,
WM. P. KEESER.